United States Patent Office 3,784,514
Patented Jan. 8, 1974

3,784,514
RAPID CURING PHENOLIC-ALDEHYDE RESIN COMPOSITION POLYMER MODIFIED WITH A HETEROCYCLIC NITROGEN-CONTAINING COMPOUND
George T. Tiedeman, Seattle, Wash., assignor to Weyerhaeuser Company, Tacoma, Wash.
No Drawing. Continuation-in-part of abandoned application Ser. No. 822,868, May 5, 1969. This application May 26, 1971, Ser. No. 147,186
Int. Cl. C08g 9/00, 9/06
U.S. Cl. 260—51.5                    45 Claims

ABSTRACT OF THE DISCLOSURE

Described herein are resin products having particular utility as rapid curing adhesives for wood and other materials, and processes for making the resin compositions. The products are made by reacting an aldehyde condensation polymer containing reactive alkylol groups, such as a phenol-formaldehyde condensation polymer, with a heterocyclic nitrogen-containing compound to obtain an amine-modified polymer. When the resulting reaction product is blended with an appropriate curing agent, such as an aldehyde, the compositions cure very rapidly at ambient temperature. When pieces of wood or other materials are spread with the preferred adhesives employing the resin compositions of this invention and brought into contact with another wood surface the bond strength develops within minutes. The durability, strength and flexibility of the adhesives of this invention under adverse weathering conditions are excellent.

CROSS REFERENCE

This application is a continuation-in-part of earlier copending application Ser. No. 822,868, filed on May 5, 1969, now abandoned, and entitled "Rapid Curing Resin Compositions Comprising an Aldehyde Condensation Polymer Modified with a Heterocyclic Nitrogen Containing Compound."

BACKGROUND OF THE INVENTION

This invention relates to a process for preparation of rapid curing resin compositions, to the resin compositions per se, and to the use of these resin compositions as adhesives.

For many years the adhesives used to bond wood together to make plywood, laminated beams, furniture, etc., have employed aldehyde condensation polymers of phenol, urea, resorcinol, etc., such as phenol-formaldehyde resins, resorcinol-formaldehyde resins, phenol-resorcinol-formaldehyde resins, urea-formaldehyde resins, and others. Although each of these resins has advantageous characteristics, they all have relatively slow curing rates.

The slow cure rates of these resins have necessitated long press times with concurrent restriction on production when used in the manufacture of laminated beams, plywood and other construction uses. To overcome the slow cure rates many modifications of the above adhesives have been proposed. Other resins, such as the epoxides, have been proposed, but their expense and certain of their physical properties have limited their use. The adhesives of this invention employ aldehyde condensation polymers modified with particular heterocyclic nitrogen-containing compounds. These resins not only have rapid cure rates but develop adequate adhesive bond strengths in a short amount of time at ambient temperature, thereby eliminating the need for long press times and application of heat to develop sufficient bond strength.

Amine-modified polymers made by reacting an aldehyde condensation polymer with certain particular amines are disclosed in U.S. Pat. Nos. 2,557,922; 1,283,706; and others. For example, Mazzucchelli et al., in U.S. Pat. No. 2,557,922, describe the preparation of modified phenol-formaldehyde condensation products by the inclusion of mono-aminodiphenyls, diaminodiphenyls, or aminodiphenylmethanes alone or as condensation products with formaldehyde. The compositions, when mixed with suitable fillers, are used primarily as electrical insulators.

Edison, in U.S. Pat. No. 1,283,706, discloses an amine-modified aldehyde condensation polymer useful in the molding of phonograph records.

SUMMARY OF THE INVENTION

This invention relates to a process for the preparation of rapid curing resin compositions for use as adhesives, and to the resin compositions per se, and particularly to the addition of a curing agent to the reaction product of certain heterocyclic nitrogen-containing compounds with an aldehyde condensation polymer having reactive alkylol groups.

This invention is also directed to a method of bonding a plurality of members, one to the other, comprising applying to a surface of a first member a first component comprising a heterocyclic-compound modified polymer of this invention, applying to a surface of a second member a second component comprising a curing agent in an amount sufficient to cause said first component to become infusible, and assembling the first and second member so that the first and second components are brought into intimate reacting contact.

The resins of this invention are prepared by reacting together an aldehyde condensation polymer having reactive alkylol groups with certain heterocyclic nitrogen-containing compounds to produce a modified condensation polymer. This resinous product is then blended with a sufficient amount of curing agent to cause the resin to become infusible. On addition of the curing agent to the modified condensation polymer the material sets to an insoluble, infusible condition at ambient temperature. Optionally, heat may be applied to increase cure speed.

The resins can be used to bond wood to wood, metal to metal, wood to metal, fabric, and many other materials where durable, moisture-resistant, heat-resistant adhesive compositions are needed.

DESCRIPTION OF THE PREFERRED EMBODIMENTS

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. "Polymers," as used herein, means resinous mixtures which do not crystallize or have a sharp melting point. "Reactive alkylol groups" are alkylol groups capable of reacting with the heterocyclic nitrogen containing compounds used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references disclose methods of preparing the condensation resins useful in this invention: "The Chemistry of Synthetic Resins" by Carelton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press, Ltd., London, England; and British Pat. 480,316.

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamide, dicyandiamide, urea, melamine-urea, melamine, and heir derivatives, and (3) ketone-aldehyde condensation polymers such as acetone-formaldehyde, methyl ethyl ketone formaldehyde, methyl isobutyl ketone formaldehyde, and the like. The preferred resins are water-soluble, liquid, thermo-setting phenol-aldehyde resins.

A preferred resin is an ortho-condensed phenol-formaldehyde resin made by condensing 0.7 to 1.0 moles formaldehyde with 1 mole phenol in the presence of an ortho-directing catalyst such as calcium acetate. Such resins are known. Each of the aldehyde condensation polymers mentioned above is prepared and kept under conditions which prevent it from condensing to an infusible state by known methods. Although phenol is the preferred reactant, the phenolic resins may be modified by incorporating into them predetermined amounts of other monohydric phenols, other dihydric phenols such as resorcinol, or other polyhydroxy aromatic compounds.

The aldehyde used in preparation of the condensation polymer may be (1) monofunctional (i.e. a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst.

In the method of this invention the aldehyde condensation polymers are modified by reaction with a pyrrole or a diamino substituted pyridine or pyrimidine to give a modified polymer. It is necessary, in order to produce the low-temperature fast curing products of this invention, to first produce the aldehyde condensation polymer and then subsequently modify that polymer with the heterocyclic nitrogen compound. Simultaneous reaction of all the reactants, i.e., phenol, formaldehyde and heterocyclic compound, generally produces an inferior, heterogeneous mass, i.e., comprising essentially a heterocyclic-formaldehyde condensation polymer containing free phenol.

The amount of heterocyclic nitrogen-containing compound used to react with the condensation polymer should range from about 0.05 to 2.0 parts by weight of the heterocyclic compound to each part of the condensation polymer and preferably 0.1 to 1.0 parts by weight of the heterocyclic compound to each part of the condensation polymer. More than 2.0 parts by weight of the heterocyclic compound to each part of the aldehyde condensation polymer can be used but there is little advantage in doing so. Most of the heterocyclic nitrogen compounds disclosed react with the aldehyde condensation polymers at room temperature, but to insure complete reaction the mixtures are usually heated to reflux. Many of these reactions are exothermic in nature and cooling is required to control the reaction. This exothermic nature of the reaction is in some instances controlled by slow addition of the heterocyclic nitrogen compound to the prepared polymer. It may be desirable under some circumstances, however, to add the polymer to solution of the heterocyclic nitrogen compound. When the resin is ready to be used, a curing agent is blended therein.

The heterocyclic compounds useful for modifying the aldehyde condensation polymers include certain substituted or unsubstituted five or six membered heterocyclic nitrogen-containing compounds such as 2,3-diaminopyridine, 2,4-diaminopyridine, 2,6-diaminopyridine, and 3,4-diaminopyridine; pyrrole; N-methylpyrrole; 2,4-dimethylpyrrole and 4,6-diaminopyrimidine.

Heterocyclic compounds having the basic structures of those suggested above, but further substituted with non-interfering substituents, are also useful in this invention. By "non-interfering substituents" is meant those substituents which do not detract from the usefulness of the heterocyclic compounds in this invention. For example, hydroxyl, ether, alkyl, aryl, cyano, sulfide, and mercaptan groups are non-interfering substituents which could be attached to the carbon rings of the suggested heterocyclic compounds without reducing their usefulness, i.e. without significantly changing resin shelf life or adhesive cure speed. A heterocyclic compound containing such a non-interfering substituent which would be satisfactory for purposes of this invention is 2,6-diamino-4-methylpyridine.

Also useful for purposes of this invention are the acid salts of the suggested heterocyclic compounds, which salts are formed by the reaction of such heterocyclic compounds with non-oxidizing acids such as the hydrohalide acids, sulphuric acid, phosphoric acid, acetic acid, propionic acid, butyric acid, and the like. These salts are equivalent, for purposes of this invention, to the free heterocyclic compounds, and will normally be present in the reaction system when aldehyde condensation polymer is reacted with the heterocyclic compound under acidic conditions.

The modified aldehyde condensation polymers described above make up the first component of the resin composition This first component is formulated to have a relatively long storage life so it can be shipped and stored for fairly long periods of time without gelation.

The second component of the resin composition is a curing agent which may be an alkylene donating compound, a diisocyanate, or an epoxide, used either alone, in combination with one another, and/or mixed with conventional thickening agents. The curing agent is blended with the modified aldehyde condensation polymer when needed. Other materials that readily donate alkylene bridges to the polymer system are also generally suitable. Reaction takes place at ambient temperature and the blended mixture gels rapidly to an insoluble, infusible state. The preferred resins of this invention set to an insoluble infusible state within a few minutes. "Insoluble" is intended to mean not soluble in common solvents such as water, alcohols, ketones, hydrocarbons, esters, glycols, and the like. Optionally, heat may be applied to the curing composition if desired to further decrease the required cure time.

Sufficient curing agent is added to the first component to form an insoluble infusible product. The amount of curing agent may range from 0.02 to 1.0 parts by weight per part of modified condensation polymer; as stoichiometric proportions are approached and surpassed the completeness of the cure approaches 100%.

The preferred curing agent is an aldehyde such as formaldehyde, though the formaldehyde-forming compounds polyoxymethylene glycol, trioxane and paraformaldehyde are quite satisfactory. Other aldehydes may be also used, for example, aliphatic or cyclic aldehydes having from 1 to 8 carbon atoms such as acrolein, glyoxal, acetaldehyde, propionaldehyde, butyraldehyde, and furfuraldehyde. Phenolic resoles and other similar polymers having free methylol groups are also efficient curing agents. Suitable diisocyanate curing agents comprise tolylene diisocyanate, phenylene diisocyanate, 1,6-hexane-diisocyanate, and the like, while suitable epoxy curing agents comprise the diglycidyl ether of bisphenol A, epoxidized phenolic novolacs, epoxidized polyglycols and the like.

When the first component comprising the modified condensation polymer and the second component comprising the aldehyde are mixed together the composition becomes infusible in a very short period of time. When bonding materials together the two components are kept separate until they are needed. They are then intimately mixed and spread on the material to be bonded by any conventional means. An automatic mixing-dispensing gun is most useful in this regard.

Certain of the resin compositions of this invention have such rapid cure times that they begin to cure before they can be spread on the material to be bonded. To overcome this problem the first component can be spread on one surface of the material to be bonded and the second component spread on the second surface to be bonded. Such a process is described in U.S. Pat. No. 2,557,826 using phenol-resorcinol-formaldehyde resins. When the surfaces are brought into contact the first and second resin components react forming an infusible glue line between the materials.

If desired, other ingredients can be added to the resin compositions. Such ingredients include fillers, pigments, plasticizers, and the like in amounts ordinarily employed for such purposes.

The resin compositions of this invention do not need additional catalyst or heat to cure them. They are curable at ambient temperatures and in very short time periods after mixing of the two components. Additionally, the resin compositions develop bond strength sufficient to hold articles together in a relatively short amount of time.

The following examples illustrate this invention. Parts and percents where used are intended to be parts and percents by weight, unless otherwise specified.

EXAMPLE 1

This example illustrates the fast cure speeds of the resin compositions of this invention. Cure speed was determined by means of "gel" time. Gel time was determined by weighing out a 10-gm. aliquot of the first component, adjusting the pH to the desired point, and mixing the second component with the first component. The time elapsed from mixing to gelling of the composition is termed "gel time."

In each instance, the compositions were formulated by mixing a modified phenol-formaldehyde polymer with additional formaldehyde. The phenol-formaldehyde polymer was made by mixing 42.06 parts by weight phenol, 4.51 parts water, 11.35 parts flake paraformaldehyde (91%) and 0.46 parts calcium acetate monohydrate. The mixture was brought to reflux (approximately 109° C.) in about 60 minutes at a uniform rate and held at reflux for 120 minutes. To 100 grams of this prepolymer was added 0.305 moles of the respective heterocyclic compounds shown in Table I. The mixture in each case was refluxed for 2.25 hours, cooled, and 26.3 grams of methanol stirred into the mixture. A 10-gram aliquot of the modified resin was then weighed out, the pH adjusted to the desired point, and 2.5 ml. of 55% formaldehyde in methanol-water solution added. The mixture was stirred rapidly until gelled, and the time recorded. While the solution pH has some effect on the gel time of the resins the determination of the optimum pH for a desired gel time can be easily determined by a skilled technician. This pH effect is dependent primarily on the particular heterocyclic compound used but also on the solvent used and the concentration of the heterocyclic compound. Table I lists the heterocyclic compounds used, the gel time and the pH range over which the gel times were obtained.

TABLE I

| Compound | Gel time, seconds | pH range |
| --- | --- | --- |
| 2,6-diaminopyridine | <70 | 0–12 |
| N-methylpyrrole | <100 | <2 |
| Pyrrole | <100 | <2 |
| 4,6-diaminopyrimidine | 100 | 5–8 |

EXAMPLE 2

A mixture of 100 grams of high solids phenol-formaldehyde prepolymer as described in Example 1 and 0.305 mole (33.2 gm.) of 2,6-diaminopyridine were refluxed for 2.25 hours, cooled, and 26.3 grams of methanol stirred into the mixture. A 10-gram aliquot of the modified resin was weighed out, 1.4 grams of concentrated hydrochloric acid added to adjust the pH, and 5.0 grams of a hardener added, the hardener comprising a solution of 55% formaldehyde in methanol and water thickened with a small quantity of refined chrysotile asbestos (96.4% formaldehyde solution and 3.6% asbestos). The composition was used in a standard cross-lap test (see Marra, A., "Geometry as an Independent Variable in Adhesive Joint Studies," Forest Products Journal, vol. XII, No. 2, pp. 81–90, 1962).

The cross-lap test is conducted by spreading the composition on the central area of a piece of Douglas fir wood 1" wide by approximately ¾" thick and 2¾" long. A similar piece of Douglas fir wood is immediately laid over the first with the grain direction at right angles. A measured quantity of resin may be used or an excess may be applied with the surplus resin allowed to squeeze out of the joint. The latter method has been used for the examples given here. As soon as the cross-lap is laid on the first piece, a pressure of 40 pounds is applied for the desired length of time. The joint is then broken in tension and the bond strength recorded. At the end of 12 minutes press time the tensile strength necessary to separate the cross-lap of this example was 90 lbs. per sq. in.

Normally wood failure begins to occur at a value of about 150 p.s.i. For many purposes, however, a bond strength well below this value is wholly satisfactory. It should also be noted that strength usually continues to increase significantly for at least a 24-hour period after initial assembly.

EXAMPLE 3

A resin was prepared using the same molar ratios of ingredients of Example 2 except that 2,3-diaminopyridine was used in place of 2,6-diaminopyridine and no hydrochloric acid was added. A cross-lap test carried out and described in Example 2 gave a tensile strength value at the end of 12 minutes press time of 72 p.s.i. The gel time of the composition was 30 seconds.

EXAMPLE 4

To 100 grams of high solids phenol-formaldehyde prepolymer prepared as described in Example 1 was added 0.305 mole of N-methylpyrrole. The mixture was refluxed for 2.25 hours, cooled, and 26.3 grams of methanol stirred into the mixture. A 10-gram aliquot of the modified resin was weighed out, 0.5 gram concentrated hydrochloric acid and 5.0 grams of the hardener of Example 2 added. The mixture was stirred rapidly and used in a cross-lap test. At the end of 12 minutes press time the tensile strength necesary to separate the cross-lap was 57 lbs. per sq. in.

EXAMPLE 5

Ten parts by weight of 2,6-diaminopyridine, 30 parts by weight of a urea-formaldehyde resin (Amres 255, a product of Pacific Resin and Chemicals Company) and 5.0 parts by weight of N,N-dimethylformamide were mixed and heated to 55° C. The mixing was continued until the amine dissolved. Amres 255 is typical of many general purpose urea-formaldehyde adhesive resins readily available on the market. It is made with an approximate 2 to 1 mole ratio of formaldehyde to urea and is cooked to a Gardner viscosity of U at a pH of 8.0 and contains 65% resin solids in a water solution.

The resin was used as the adhesive in the cross-lap test described previously by taking 10 parts by weight of the resin and 5 parts by weight of a solution of 55% formaldehyde in methanol and water. Concentrated hydrochloric acid, 0.2 part by weight, was added to adjust the pH. The adhesive composition was spread on a cross-lap joint. After 12 minutes press time the tensile strength necessary to separate the cross-lap was 105 p.s.i. The gel time of the composition was 10 seconds.

EXAMPLE 6

Ten parts by weight of 2,6-diaminopyridine were charged to a reaction vessel and 20 parts by weight of N,N-dimethylformamide were added by stirring. To this mixture was added 30 parts by weight of a melamine-urea-formaldehyde resin (Melurac 400, a product of American Cyanamid Company). This is a 100% solids, spray-dried adhesive resin typical of many similar products commercially available which are intended for hot press or radio frequency bonding of wood products. Resins of this type are described in British Pat. 480,316. The mixture was heated to approximately 55° C. and a slow addition begun of 12.5 parts by weight of a 55% solution of formaldehyde in methanol. An exotherm took place that increased the temperature to 65° C. After a short period of additional mixing the resin was cooled to 25° C. The above resin was tested in the standard cross-lap by taking 10 parts by weight of the resin, adding 0.5 part by weight concentrated hydrochloric acid for pH adjustment and 5 parts by weight of an asbestos-thickened solution of formaldehyde and methanol as described in Example 2. The cross-lap developed a tensile strength of 75 p.s.i. after pressing 7 minutes and 150 p.s.i. after pressing 10 minutes. The gel time of the composition was 15 seconds.

EXAMPLE 7

This experiment was conducted to demonstrate the disadvantage of simultaneous reaction of a heterocyclic nitrogen containing compound with the reactants used to produce an aldehyde condensation polymer. (As previously suggested, it is generally better to first produce the aldehyde condensation polymer and subsequently react it with the nitrogen compound.)

The following ingredients were placed in a reactor:

69.0 gms. of 91.4% phenol
1.2 gms. water
16.7 gms. 93.2% flake paraformaldehyde
0.75 gm. calcium acetate monohydrate
29.1 gms. 2,6-diaminopyridine
22.95 gms. methanol Heat was applied, raising the temperature from 24° C. to 30° C. At this point an exothermic reaction was noted and the application of heat discontinued. The temperature continued to rise, and at 48° C. the mixture began to gel. Cooling was then applied, but the temperature rose to 57° C. before starting to drop. At 25° C. the product had the consistency of a firm gel and was unusable as an adhesive.

EXAMPLE 8

This experiment was conducted to demonstrate the advantage of preparing the resin of this invention by reacting the heterocyclic nitrogen containing compound with a previously prepared aldehyde condensation polymer, as opposed to simultaneous reaction of the nitrogen compound with the reactants used to produce the aldehyde condensation polymer. The experiment also illustrates the use of a curing agent comprising an aldehyde-epoxide mixture.

PREPARATION OF A RESIN OF THIS INVENTION

An aldehyde condensation polymer was prepared as follows. The following ingredients were placed in a reactor:

42.06 parts phenol
11.35 parts of 91% flake paraformaldehyde
4.51 parts water
.46 part calcium acetate The above ingredients were mixed together and the temperature of the mixture adjusted to 25° C. The mixture was then heated at a uniform rate over a period of 60 minutes to a final reflux temperature of 109° C. Refluxing was continued for 120 minutes followed by cooling of the resultant reaction product.

An epoxide-aldehyde curing agent was prepared by mixing the following ingredients:

49.08 parts formaldehyde solution (55% formaldehyde in methanol-water solution)
1.84 parts asbestos
49.08 parts epoxy resin made by the epoxidation of a phenol-formaldehyde novolac, the epoxide resin having an average of 2.2 epoxy group per molecule (DEN 431, an epoxidized novolac, made by the Dow Chemical Co.)

A modified aldehyde condensation resin of this invention was prepared as follows. A mixture of 100 grams of the aldehyde condensation polymer described above and 0.305 mole of 2,6-diaminopyridine were heated to reflux for 2.25 hours, cooled, and then mixed with 26.3 grams of methanol.

The gel time for a mixture of the modified aldehyde condensation resin and the epoxide-aldehyde curing agent was measured as follows. To 10 grams of the resin was added 5 gms. of curing agent. The mixture was stirred rapidly until gelled and the time recorded. Gel time in this case was 25 seconds.

The strength of the modified aldehyde condensation resin as an adhesive was measured as follows. The resin and curing agent were mixed in the same manner as in the determination of gel time, and spread on a wood block before the resin set. Another wood block was placed on top of the resin and pressed at 40 p.s.i. for three minutes. This was followed by measurement of the tensile force-per-unit area necessary to separate the blocks. In this case a force of 115 p.s.i. was required.

SIMULTANEOUS MIXTURE OF ALL INGREDIENTS

An attempt was made to repeat the above experiment using identical ingredients and a procedure which involved simultaneous reaction of the 2,6-diaminopyridine with the ingredients used in the preparation of the aldehyde condensation polymer. The phenol, calcium acetate, and 2,6-diaminopyridine were mixed together and the formaldehyde added dropwise at elevated temperature. The mixture was then refluxed for 2.25 hours, cooled, and the remaining were added. The resulting product was a heterogeneous mass which could not be tested for gel time or adhesive strength.

EXAMPLE 9

This experiment was conducted to demonstrate the use of a curing agent comprising a diisocyanate.

An aldehyde condensation polymer was prepared as described in Example 8. To 90.0 grams of this polymer was added 29.9 grams of 2,6-diaminopyridine. The mixture was then heated in 20 minutes from 21° C. to reflux at 108° C. Refluxing was continued for 2.25 hours, followed by cooling to 60° C. Finally, 26.3 grams of methanol was added to the reaction product.

One part of the curing agent tolylene-2,4-diisocyanate was then mixed with 4 parts of the modified condensation polymer. The mixture was stirred rapidly and gelled in less than 10 seconds. Next a fresh mixture of resin and curing agent was spread on a wood block which was then covered with a second wood block; the resulting sandwich was pressed at 40 p.s.i. for 12 minutes. A force of 65 p.s.i. was then required to separate the blocks.

What is claimed is:

1. A modified condensation polymer comprising the reaction product of a phenoplast having reactive alkylol groups with a heterocyclic nitrogen-containing compound selected from the group consisting of pyrrole, N-methylpyrrole, 2,4-dimethylpyrrole, and 2,3-, 2,4-, 2,6-, and 3,4-diaminopyridine; the amount of said nitrogen-containing compound being at least 0.05 part by weight per part of said phenoplast; said phenoplast comprising an aldehyde condensed with phenol, cresol, resorcinol or phenol-resorcinol; and said reaction product being further reactable at ambient temperatures with a curing agent to form an insoluble, infusible product.

2. The modified polymer of claim 1 wherein said nitrogen-containing compound is 2,6-diaminopyridine.

3. The modified polymer of claim 1 wherein said nitrogen-containing compound is N-methylpyrrole.

4. The modified polymer of claim 1 wherein said nitrogen-containing compound is pyrrole.

5. The modified polymer of claim 1 wherein said phenoplast is a phenol-formaldehyde resin.

6. The modified polymer of claim 5 wherein said nitrogen-containing compound is 2,6-diaminopyridine, N-methylpyrrole or pyrrole.

7. The modified polymer of claim 1 wherein the amount of said nitrogen-containing compound is from 0.05 to 2.0 parts by weight per part of said phenoplast.

8. The modified polymer of claim 1 wherein the amount of said nitrogen-containing compound is at least 0.1 part by weight per part of said phenoplast.

9. The modified polymer of claim 8 wherein said phenoplast is a phenol-formaldehyde resin.

10. The modified polymer of claim 9 wherein said nitrogen-containing compound is 2,6-diaminopyridine, N-methylpyrrole or pyrrole.

11. The modified polymer of claim 1 wherein the amount of said nitrogen-containing compound is from 0.1 to 1.0 part by weight per part of said phenoplast.

12. The modified polymer of claim 11 wherein said phenoplast is a phenol-formaldehyde resin.

13. The modified polymer of claim 12 wherein said nitrogen-containing compound is 2,6-diaminopyridine, N-methylpyrrole or pyrrole.

14. The modified polymer of claim 1 wherein said phenoplast is a phenol-formaldehyde resole produced by condensing 0.7 to 1.0 mole formaldehyde with 1 mole phenol in the presence of an ortho directing catalyst.

15. The modified polymer of claim 14 wherein said nitrogen-containing compound is 2,6-diaminopyridine, N-methylpyrrole or pyrrole.

16. The modified polymer of claim 15 wherein the amount of said nitrogen-containing compound is from 0.1 to 1.0 part by weight per part of said phenoplast.

17. The modified polymer of claim 1 wherein said aldehyde is formaldehyde.

18. A rapid curing adhesive composition comprising (a) a modified condensation polymer comprising the reaction product of a phenoplast having reactive alkylol groups with a heterocyclic nitrogen-containing compound selected from the group consisting of pyrrole, N-methylpyrrole, 2,4-dimethylpyrrole and 2,3-, 2,4-, 2,6-, and 3,4-diaminopyridine; the amount of said nitrogen-containing compound being at least 0.05 part by weight per part of said phenoplast; said phenoplast comprising an aldehyde condensed with phenol, cresol, resorcinol or phenol-resorcinol; and (b) a curing agent reactable with said modified condensation polymer at ambient temperatures, the amounts of said modified polymer and curing agent being sufficient to cause said composition to rapidly become insoluble and infusible at ambient temperatures.

19. The composition of claim 18 wherein said nitrogen-containing compound is 2,6-diaminopyridine, N-methylpyrrole or pyrrole.

20. The composition of claim 18 wherein said curing agent comprises an alkylene donating compound, a diisocyanate, or an epoxide.

21. The composition of claim 18 wherein said curing agent comprises an alkylene donating compound.

22. The composition of claim 18 wherein said curing agent comprises formaldehyde.

23. The composition of claim 18 wherein the amount of curing agent is from 0.02 to 1.0 part by weight per part by weight of said modified condensation polymer.

24. The composition of claim 18 wherein said phenoplast is a phenol-formaldehyde resin.

25. The composition of claim 24 wherein said nitrogen-containing compound is 2,6-diaminopyridine, N-methylpyrrole or pyrrole.

26. The composition of claim 18 wherein the amount of said amine is from 0.1 to 1.0 part by weight per part of said phenoplast.

27. The composition of claim 18 wherein said phenoplast is a phenol-formaldehyde resole produced by condensing 0.7 to 1.0 mole formaldehyde with 1 mole phenol in the presence of an ortho directing catalyst.

28. The composition of claim 27 wherein said nitrogen-containing compound is 2,6-diaminopyridine, N-methylpyrrole or pyrrole.

29. The composition of claim 28 wherein the amount of said nitrogen-containing compound is from 0.1 to 1.0 part by weight per part of said phenoplast.

30. A process for the preparation of a rapid curing adhesive comprising (1) blending together at ampient temperatures
(a) a modified condensation polymer comprising the reaction product of a phenoplast having reactive alkylol groups with a heterocyclic nitrogen-containing compound selected from the group consisting of pyrrole, N-methylpyrrole, 2,4-dimethylpyrrole, and 2,3-, 2,4-, 2,6-, and 3,4-diaminopyridine; the amount of said nitrogen-containing compound being at least 0.05 part by weight per part of said phenoplast; said phenoplast comprising an aldehyde condensed with phenol, cresol, resorcinol or phenol-resorcinol; and
(b) a curing agent reactable with said modified condensation polymer at ambient temperatures, the amounts of said modified polymer and curing agent being sufficient to cause said composition to rapidly become insoluble and infusible at ambient temperatures; and (2) allowing the resulting blend to cure to an insoluble, infusible state at ambient temperatures.

31. The process of claim 30 wherein said nitrogen-containing compound is 2,6-diaminopyridine, N-methylpyrrole or pyrrole.

32. The process of claim 30 wherein said curing agent comprises an alkylene donating compound, a diisocyanate or an epoxide.

33. The process of claim 30 wherein said curing agent comprises an alkylene donating compound.

34. The process of claim 30 wherein said curing agent comprises formaldehyde.

35. The process of claim 30 wherein the amount of curing agent is from 0.02 to 1.0 part by weight per part by weight of said modified condensation polymer.

36. The process of claim 30 wherein said phenoplast is a phenol-formaldehyde resin.

37. The process of claim 36 wherein said nitrogen-containing compound is 2,6-diaminopyridine, N-methylpyrrole or pyrrole.

38. The process of claim 30 wherein the amount of said nitrogen-containing compound is from 0.1 to 1.0 part by weight per part of said phenoplast.

39. The process of claim 30 wherein said phenoplast is a phenol-formaldehyde with 1 mole phenol in the presence of an ortho directing catalyst.

40. The process of claim 39 wherein said nitrogen-containing compound is 2,6-diaminopyridine, N-methylpyrrole or pyrrole.

41. The process of claim 40 wherein the amount of said nitrogen-containing compound is from 0.1 to 1.0 part by weight per part of said phenoplast.

42. A process for producing a liquid modified condensation polymer comprising reacting at elevated temperatures a phenoplast containing reactive alkylol groups with a heterocyclic nitrogen-containing compound selected from the group consisting of pyrrole, N-methylpyrrole, 2,4-dimethylpyrrole, and 2,3-, 2,4-, 2,6-, and 3,4-diaminopyridine; the amount of said nitrogen-containing compound being at least 0.05 part by weight per part of said phenoplast; said phenoplast comprising an aldehyde condensed with phenol, cresol, resorcinol or phenol-resorcinol; and said modified polymer being liquid and further reactable at ambient temperatures with a curing agent to form an insoluble, infusible product.

43. The process of claim 42 wherein said phenoplast is a phenol-formaldehyde resin.

44. The process of claim 42 wherein said nitrogen-containing compound is 2,6-diaminopyridine, N-methylpyrrole or pyrrole.

45. The process of claim 44 wherein said phenoplast is a phenol-formaldehyde resin.

References Cited

UNITED STATES PATENTS

| | | | |
|---|---|---|---|
| 3,364,179 | 1/1968 | Kirkpatrick | 260—51.5 |
| 3,376,262 | 4/1968 | Pasky | 260—59 |
| 3,377,317 | 4/1968 | Hoxie | 260—59 |
| 3,398,122 | 8/1968 | Shepard et al. | 260—59 X |
| 3,436,373 | 4/1969 | Cox et al | 260—51.5 |
| 3,444,137 | 5/1969 | Higginbottom | 260—51.5 |
| 3,459,708 | 8/1969 | Stevens | 260—59 |
| 3,461,099 | 8/1969 | Muzyczko | 260—59 |
| 3,487,046 | 12/1969 | Negrevergne | 260—51.5 |
| 3,509,096 | 4/1970 | Sobel | 260—51.5 |
| 3,546,172 | 12/1970 | Johnson et al. | 260—51.5 |
| 3,558,559 | 1/1971 | Le Blanc | 260—51.5 |
| 3,558,560 | 1/1971 | Huck et al. | 260—59 |
| 3,563,952 | 2/1971 | Schmoll | 260—59 |
| 3,678,103 | 7/1972 | Huck | 260—51.5 |
| 3,275,605 | 9/1966 | Eastes et al. | 260—70 |
| 3,309,341 | 3/1967 | Abrahams et al. | 260—70 |
| 3,489,718 | 1/1970 | Goullon et al. | 260—70 |
| 3,630,998 | 12/1971 | Schibler | 260—67.6 |
| 3,689,463 | 9/1972 | Kruglikov et al. | 260—70 |
| 3,645,973 | 2/1972 | Schibler | 260—67.6 |
| 2,287,756 | 6/1942 | Brookes | 260—67.6 |
| 2,475,587 | 7/1949 | Bender et al. | 260—57 |
| 2,962,442 | 11/1960 | Andress | 260—53 X |

FOREIGN PATENTS

| | | |
|---|---|---|
| 413,655 | 7/1943 | Canada. |
| 615,335 | 1/1949 | United Kingdom. |

OTHER REFERENCES

Modern Plastics Encyclopedia, 1968, pp. 9, 13, 141–144, 183–184.

Phenolic Resins, Whitehouse, 1967, pp. 3–5, 7–9, 32–33.

HOWARD E. SCHAIN, Primary Examiner

U.S. Cl. X.R.

161—261, 262; 260—29.3, 29.4 R, 63, 68.6 R, 10 R, 54, 59, 828, 831, 834

UNITED STATES PATENT OFFICE
CERTIFICATE OF CORRECTION

Patent No. 3,784,514  Dated January 8, 1974

Inventor(s) GEORGE T. TIEDEMAN

It is certified that error appears in the above-identified patent and that said Letters Patent are hereby corrected as shown below:

in column 3, line 17, "heir" should read --their--;

in column 4, line 40, "aldehyde" should read --the aldehyde--;

in column 8, line 66, "were" should read --water--;

in column 11, claim 39, lines 13, 14, "with 1 mole phenol in the presence of an ortho directing catalyst." should read --resole produced by condensing 0.7 to 1.0 mole formaldehyde with 1 mole phenol in the presence of an ortho directing catalyst.--.

Signed and sealed this 1st day of October 1974.

(SEAL)
Attest:

McCOY M. GIBSON JR.
Attesting Officer

C. MARSHALL DANN
Commissioner of Patents